US011469881B2

(12) United States Patent
Shim et al.

(10) Patent No.: US 11,469,881 B2
(45) Date of Patent: Oct. 11, 2022

(54) APPARATUS AND METHOD FOR FORGERY PREVENTION OF DIGITAL INFORMATION

(71) Applicant: KOREA INSTITUTE OF SCIENCE AND TECHNOLOGY, Seoul (KR)

(72) Inventors: Jae Wan Shim, Seoul (KR); Heon Phil Ha, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 95 days.

(21) Appl. No.: 16/721,986

(22) Filed: Dec. 20, 2019

(65) Prior Publication Data

US 2020/0213092 A1    Jul. 2, 2020

(30) Foreign Application Priority Data

Dec. 26, 2018    (KR) .......................... 10-2018-0169921
Dec. 17, 2019    (KR) .......................... 10-2019-0169192

(51) Int. Cl.
*H04L 29/06*    (2006.01)
*H04L 9/32*    (2006.01)
*H04L 9/06*    (2006.01)

(52) U.S. Cl.
CPC .......... *H04L 9/0643* (2013.01); *H04L 9/3278* (2013.01)

(58) Field of Classification Search
CPC ........................... H04L 9/0643; H04L 9/3278
See application file for complete search history.

(56) References Cited

U.S. PATENT DOCUMENTS

| | | | | |
|---|---|---|---|---|
| 7,269,736 | B2* | 9/2007 | Howard | G06F 21/602 |
| | | | | 713/180 |
| 7,590,850 | B2* | 9/2009 | Kim | H04L 9/3255 |
| | | | | 713/176 |
| 8,601,358 | B2* | 12/2013 | Thiesfeld | H03M 13/09 |
| | | | | 714/763 |
| 8,984,100 | B2* | 3/2015 | Fu | H04L 67/104 |
| | | | | 709/219 |
| 8,990,906 | B2* | 3/2015 | Holland | G06F 21/88 |
| | | | | 726/6 |
| 9,311,398 | B2* | 4/2016 | Stone | H04L 67/01 |
| 9,386,037 | B1* | 7/2016 | Hunt | H04L 63/1433 |

(Continued)

FOREIGN PATENT DOCUMENTS

KR    101105205 B1    1/2012
KR    20170054848 A    5/2017

*Primary Examiner* — Gary S Gracia
(74) *Attorney, Agent, or Firm* — Rabin & Berdo, P.C.

(57) ABSTRACT

Provided are an apparatus and method for forgery prevention of digital information. The apparatus for forgery prevention of digital information includes: a digital information obtaining unit configured to obtain digital information in real time; a seed value generator configured to generate a seed value carrying characteristics of the digital information obtained using the digital information obtaining unit; an information piece generator configured to divide the digital information obtained using the digital information obtaining unit, into continuous information pieces with a sequence; and a hash value generator configured to generate a hash value of a first information piece from the seed value and the first information piece and generate a hash value of a subsequent information piece by using a hash value of a previous information piece and the subsequent information piece as inputs.

24 Claims, 8 Drawing Sheets

(56) References Cited

U.S. PATENT DOCUMENTS

| | | | |
|---|---|---|---|
| 9,563,683 B2* | 2/2017 | Abercrombie | G06F 16/137 |
| 10,887,080 B2* | 1/2021 | Almuhammadi | G06F 21/78 |
| 2007/0300249 A1* | 12/2007 | Smith | H04N 21/4314 |
| | | | 725/19 |
| 2007/0300250 A1* | 12/2007 | Smith | G06V 20/40 |
| | | | 725/135 |
| 2008/0034276 A1* | 2/2008 | Ficco | H04L 65/765 |
| | | | 715/204 |
| 2009/0190659 A1* | 7/2009 | Lee | H04N 19/119 |
| | | | 375/E7.243 |
| 2011/0055471 A1* | 3/2011 | Thatcher | G06F 3/0679 |
| | | | 711/216 |
| 2011/0185193 A1* | 7/2011 | Grube | G06F 21/80 |
| | | | 713/189 |
| 2013/0254890 A1* | 9/2013 | Wu | G06F 21/566 |
| | | | 726/23 |
| 2013/0263255 A1* | 10/2013 | Wolf | G06F 21/64 |
| | | | 726/21 |
| 2014/0006796 A1* | 1/2014 | Smith | G06F 21/00 |
| | | | 713/187 |
| 2014/0029666 A1* | 1/2014 | Sakomizu | H04N 19/395 |
| | | | 375/240.12 |
| 2014/0229582 A1* | 8/2014 | Liu | H04L 67/06 |
| | | | 709/219 |
| 2014/0344195 A1* | 11/2014 | Drew | G06F 16/35 |
| | | | 706/12 |
| 2015/0019510 A1* | 1/2015 | Aronovich | G06F 3/0641 |
| | | | 707/692 |
| 2015/0019511 A1* | 1/2015 | Aronovich | G06F 3/0629 |
| | | | 707/692 |
| 2015/0019833 A1* | 1/2015 | Aronovich | G06F 3/0629 |
| | | | 711/171 |
| 2016/0027015 A1* | 1/2016 | Redpath | G06Q 20/202 |
| | | | 705/72 |
| 2016/0050073 A1* | 2/2016 | Kolesnikov | H04L 9/3242 |
| | | | 713/181 |
| 2016/0170571 A1* | 6/2016 | Hoshino | H04L 12/1822 |
| | | | 348/14.03 |
| 2016/0266840 A1* | 9/2016 | Aronovich | G06F 16/1752 |
| 2017/0006182 A1* | 1/2017 | Marinkin | H04N 1/32256 |
| 2017/0075938 A1* | 3/2017 | Black | H04L 9/3239 |
| 2017/0161724 A1* | 6/2017 | Lau | G06Q 20/353 |
| 2017/0169250 A1* | 6/2017 | White | H04L 9/0822 |
| 2017/0302936 A1* | 10/2017 | Li | H04N 19/503 |
| 2017/0346693 A1* | 11/2017 | Dix | H04L 9/3247 |
| 2018/0101844 A1* | 4/2018 | Song | H04L 9/3265 |
| 2018/0294977 A1* | 10/2018 | Uhr | G06F 21/33 |
| 2018/0300507 A1* | 10/2018 | Uhr | G06F 21/62 |
| 2019/0095263 A1* | 3/2019 | Lahav | G06F 11/3006 |
| 2019/0279210 A1* | 9/2019 | Pen | G06Q 20/38215 |
| 2019/0289454 A1* | 9/2019 | Inoue | G06F 16/1824 |
| 2019/0349753 A1* | 11/2019 | Chen | H04W 4/14 |
| 2020/0153633 A1* | 5/2020 | Park | H04L 9/3239 |

\* cited by examiner

APPARATUS AND METHOD FOR FORGERY PREVENTION OF DIGITAL INFORMATION

CROSS-REFERENCE TO RELATED APPLICATION

This application claims the benefit of Korean Patent Application No. 10-2018-0169921, filed on Dec. 26, 2018 and Korean Patent Application No. 10-2019-0169192, filed on Dec. 17, 2019, in the Korean Intellectual Property Office, the disclosure of which is incorporated herein in its entirety by reference.

BACKGROUND

1. Field

One or more embodiments relate to an apparatus and method for forgery prevention of digital information, and more particularly, to an apparatus and method for forgery prevention of digital information using a hash value.

2. Description of Related Art

In the past, documents were often written by hand when making a contract on matters that could be disputed or important matters between the parties. Even for a printed document which is not written by hand, the authenticity of the contents of the document would be guaranteed by the signature and seal of the author of the document.

Recently, with the rapid progress in information and communication technology, storage of digital information by using electromagnetic storage media such as storage devices in electronic devices such as computers, closed-circuit television (CCTV), black boxes, dashboard cameras, voice recorders, video cameras and smart phones, external hard disks, external solid state disks and portable storage devices, has become commonplace. In addition, unlike paper documents which are easy to destroy or damage, when digital document files are stored on electromagnetic storage media and deleted, the deleted data can often be recovered, and thus various digital files play a decisive role as evidence, for example, in court.

However, until now, in the case of media files such as video files recorded using CCTV, black boxes, etc. among digital file-type information, firstly a first hash value of each media file is generated when collection of evidence is made at the request of an investigating agency, and later, forgery verification for the media file is performed by regenerating a second hash value from each media file and then comparing the second hash value with the first hash value. Here, a hash value is a value output by applying a hash function to a media file. A hash function is characterized in that different hash values are output according to input data. Thus, only when a portion of input data is modified, a completely different hash value is output. A hash function has a characteristic whereby it is difficult to inversely infer input data from an output hash value. By using a hash function in this manner, whether a media file is forged or not after collection of evidence may be determined. However, it is difficult to determine whether a media file was forged by somebody before collection of evidence. Also, it is not known how to apply a hash function to digital information such as media files generated in real time to prevent forgery.

Another example of forgery prevention of digital information is the use of a watermark. For example, to prevent forgery of image data, a watermark is inserted into the image data itself to allow a server or the like receiving the image data to recognize forgery of the image data. However, when a watermark is inserted into image data as in image data security technologies according to the related art, the drawback is that the image data itself is distorted to some extent. In addition, the watermark inserted into the image data may be damaged while compressing the image data, and thus, there is a limitation in that original image data before the watermark is inserted thereinto is not completely preserved. As the watermark to be inserted has a regular pattern, when the pattern is exposed, the image data may even become prone to forgery, contrary to the original purpose.

SUMMARY

One or more embodiments include an apparatus and method for forgery prevention of digital information generated in real time.

However, the objectives of the present disclosure are not limited to the above-stated objectives, and other technical objectives not stated will be clearly understood from the description below by one of skill in the art, to which the present disclosure pertains.

Additional aspects will be set forth in part in the description which follows and, in part, will be apparent from the description, or may be learned by practice of the presented embodiments of the disclosure.

According to one or more embodiments, an apparatus for forgery prevention of digital information includes:

a digital information obtaining unit configured to obtain digital information in real time;

a seed value generator configured to generate a seed value carrying characteristics of the digital information obtained using the digital information obtaining unit;

an information piece generator configured to divide the digital information obtained using the digital information obtaining unit, into continuous information pieces with a sequence; and a hash value generator configured to generate a hash value of a first information piece from the seed value and the first information piece and generate a hash value of a subsequent information piece by using a hash value of a previous information piece and the subsequent information piece as inputs.

In one embodiment, the digital information obtaining unit may include a black box, a dashboard camera, a closed circuit television (CCTV), a video camera, a microphone, or a microphone or a camera of a smartphone.

In one embodiment, the digital information may be real-time image data or real-time voice data.

In one embodiment, the seed value may be generated in a preset size based on at least one of a time when the digital information is first generated, a location where the digital information is first generated, a title of the digital information, and a characteristic value of the apparatus for forgery prevention of digital information.

In one embodiment, a size of the seed value may be equal to a size of the hash value.

In one embodiment, the information piece generator may fill an empty place of a final information piece with a preset value when a size of the final information piece is smaller than a preset size.

In one embodiment, the hash value generator may include, as an input value of calculation of a corresponding hash value, a time value in addition to a corresponding information piece and a previous hash value.

The apparatus may further include a communicator configured to transmit the seed value and a hash value of a final information piece to an external server. The communicator may transmit, to the external server, hash values of information pieces generated using the hash value generator.

According to one or more embodiments, a method of forgery prevention of digital information includes:
obtaining digital information in real time;
generating a seed value carrying characteristics of the obtained digital information;
dividing the obtained digital information into continuous information pieces with a sequence; and
generating hash values of the information pieces, wherein the generating hash values of the information pieces includes
generating a hash value of a first information piece from the seed value and the first information pieces, and
generating a hash value of a subsequent information piece by using a hash value of a previous information piece and the subsequent information piece as inputs.

In one embodiment, the method may further include transmitting, to a second apparatus for forgery prevention, a digital file including the digital information, the seed value, and the hash value of the final information piece.

In one embodiment, the transmitting of the digital file to the second apparatus for forgery prevention may be performed according to a transmission command, may be performed when the seed value and the hash value of the final information piece is transmitted to the external server, or may be performed simultaneously with an operation of receiving a second digital file from the second apparatus for forgery prevention.

According to one or more embodiments, a terminal for accessing a server through a network when a digital forgery prevention application is activated, is included, wherein the digital forgery prevention application is installed on the terminal and includes:
obtaining digital information in real time;
generating a seed value carrying characteristics of the digital information;
dividing the digital information into continuous information pieces with a sequence; and
generating hash values of the information pieces,
wherein in the generating of hash values of the information pieces, a hash value of a first information piece is generated from the seed value and the first information piece, and
a hash value of a subsequent information piece is generated by using a hash value of a previous information piece and the subsequent information piece as inputs, and
the seed value and a hash value of a final information piece are transmitted to the server.

According to one or more embodiments, a certificate managing server for providing a digital forgery prevention service through a network is included, the certificate managing server including:
a digital information obtaining unit configured to obtain digital information in real time from a user terminal through the network;
a seed value generator configured to generate a seed value carrying characteristics of the digital information;
an information piece generator configured to divide the digital information into continuous information pieces with a sequence;
a hash value generator configured to generate a hash value of a first information piece from the seed value and the first information piece, and generate a hash value of a subsequent information piece by using a hash value of a previous information piece and the subsequent information piece as inputs, and
a communicator configured to transmit the seed value and a hash value of a final information piece to the user terminal.

In one embodiment, the certificate managing server may store the seed value and the hash value of the final information piece.

According to one or more embodiments, a terminal for accessing a contract managing server through a network when a digital forgery prevention application is activated, is included, wherein the digital forgery prevention application is installed on the terminal and includes:
obtaining digital information containing the contents of a contract in real time;
generating a seed value carrying characteristics of the digital information;
dividing the digital information into continuous information pieces with a sequence; and
generating hash values of the information pieces,
wherein in the generating of hash values of the information pieces, a hash value of a first information piece is generated from the seed value and the first information piece, and
a hash value of a subsequent information piece is generated by using a hash value of a previous information piece and the subsequent information piece as inputs, and
the seed value and a hash value of a final information piece are transmitted to the contract managing server, and
the digital information, the seed value, and the hash value of the final information piece are transmitted to a terminal of the other party to the contract.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
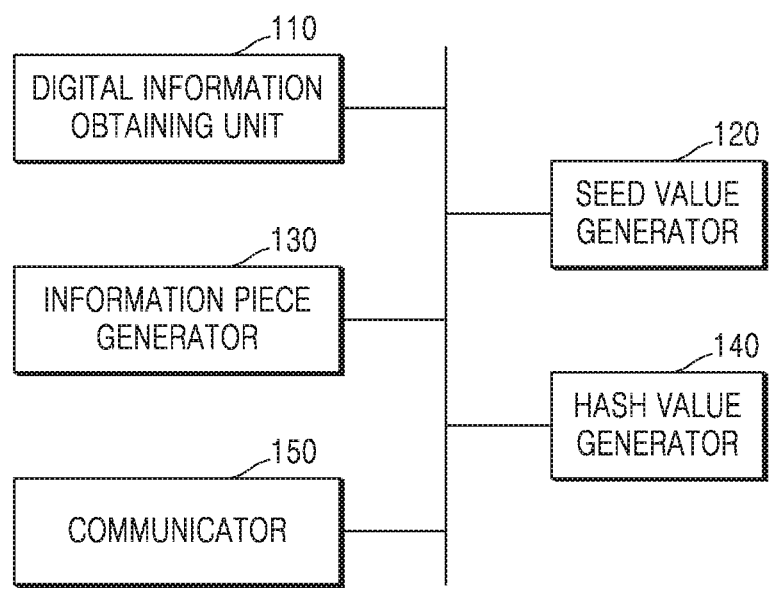
FIG. 1 is a structural diagram of an apparatus for forgery prevention of digital information, according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

While such terms as "first," "second," etc., may be used to describe various elements, such elements must not be limited to the above terms. The above terms are used only to distinguish one element from another.

The terms used in the present specification are merely used to describe particular embodiments, and are not intended to limit the present disclosure. An expression used in the singular form encompasses the expression in the plural form, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present disclosure may be described in terms of functional block components and various processing steps. Such functional blocks may be realized by any number of hardware or/and software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the inventive concept may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present disclosure could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

Hereinafter, various embodiments of the present disclosure will be described in detail with reference to the accompanying drawings.

FIG. 1 is a structural diagram of an apparatus for forgery prevention of digital information, according to an embodiment of the present disclosure.

Referring to FIG. 1, the apparatus for forgery prevention of digital information includes a digital information obtaining unit 110, a seed value generator 120, an information piece generator 130, a hash value generator 140, and a communicator 150.

At least some of the components of the apparatus for forgery prevention of digital information according to the present embodiment, that is, the digital information obtaining unit 110, the seed value generator 120, the information piece generator 130, the hash value generator 140, and the communicator 150, may be a certain program module such as an operating system, an application program module, and other program modules, and may be physically stored in various types of well-known memory devices. In addition, the program modules may also be stored in a remote memory device capable of communicating with a forgery prevention apparatus. The program modules may encompass routines, subroutines, programs, objects, components, data structures or the like that execute a particular task according to the present disclosure to be described later or particular abstract data types, but the present disclosure is not limited to these program modules.

The digital information obtaining unit 110 obtains digital information in real time. For example, the digital information obtaining unit 110 may be a black box, a dashboard camera, a closed circuit television (CCTV), a video camera, a microphone, a microphone or a camera of a smartphone, or the like. The obtained digital information may be raw data, but is not limited thereto. For example, digital information may be data that is converted into a certain format in real time or data compressed in real time.

The seed value generator 120 may generate a seed value in a preset size (for an example, 256 bits) based on information carrying the characteristics of digital information by using a hash function or the like. The information carrying the characteristics of digital information is, for example, a time when the digital information is first generated, a location where the digital information is first generated, a title of the digital information, or a characteristic value of an apparatus for forgery prevention of the digital information.

The information piece generator 130 divides the digital information obtained using the digital information obtaining unit 110, into a smaller size than the size of the digital information in a time sequential manner. The information obtained by the above dividing is defined as a continuous information piece with a sequence (hereinafter briefly referred to as 'information piece'). Division into information pieces may be performed based on an information amount such as 256 bits or a time unit such as minutes or seconds. Image data may be divided into information pieces based on frames. A size of a final information piece may be various, and thus, when the size of a final information piece is smaller than a set size, an empty place of the final information piece is filled with a preset value (for example, 0).

The hash value generator 140 receives a previous hash value and a corresponding information piece and calculates a corresponding hash value corresponding to the corresponding information piece by applying a hash algorithm. A first information piece does not have a previous hash value, and thus, a hash value of the first information piece is calculated by using a seed value and the first information piece as inputs. A final hash value of a final information piece is calculated by using a previous hash value and the final information piece as inputs.

The communicator 150 may include at least one of a wired communication module and a wireless communication module that are connectable to an external server. For example, the communicator 150 may include at least one of a WiFi communication module, a Bluetooth communication module, and a mobile communication module. Instead of the communicator 150, a data input/output port via which external data may be input or output may be provided, and the apparatus for forgery prevention of digital information may be connected to a server through a combination of an external-type communication module and the data input/output port. For example, when a WiFi or Bluetooth connecting device is provided in a video recorder, the video recorder may be linked to a smartphone to transmit a final hash value and a seed value to a server. An external server may be located at any place as long as a time when a final hash value and a seed value are received and the final hash value and the seed value are recorded. For example, a server may be an e-mail server, a social network service (SNS) server or a storage that specially receives and stores only a hash value and a seed value. The communicator 150 may also transmit hash values of information pieces to a server. In addition, the communicator 150 may transmit, to a server, setting information required to generate a hash value or information related to generating of a seed value.

Figure 2:
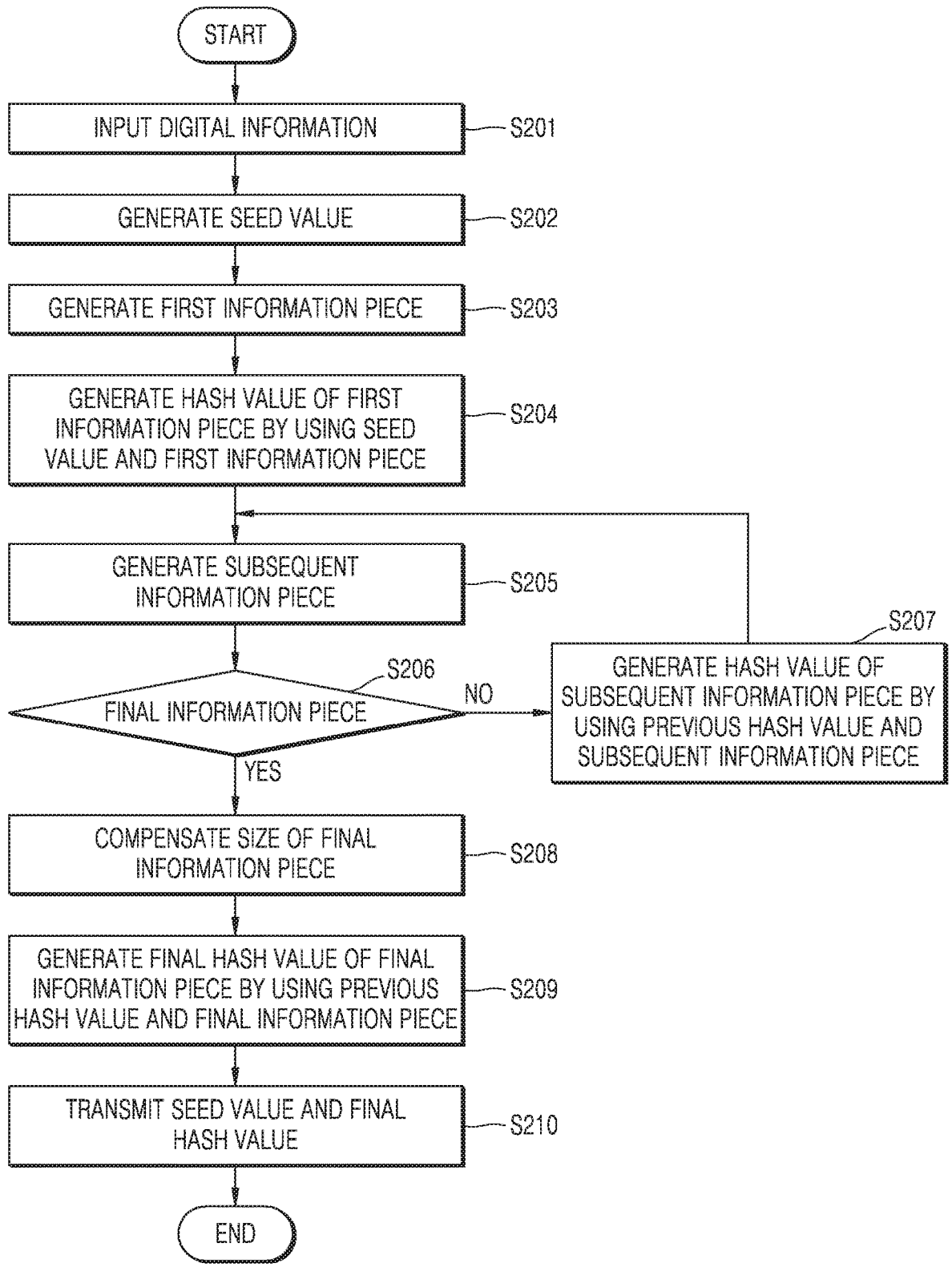
FIG. 2 is a flowchart of a method of forgery prevention of digital information, according to an embodiment of the present disclosure.
Figure 3:
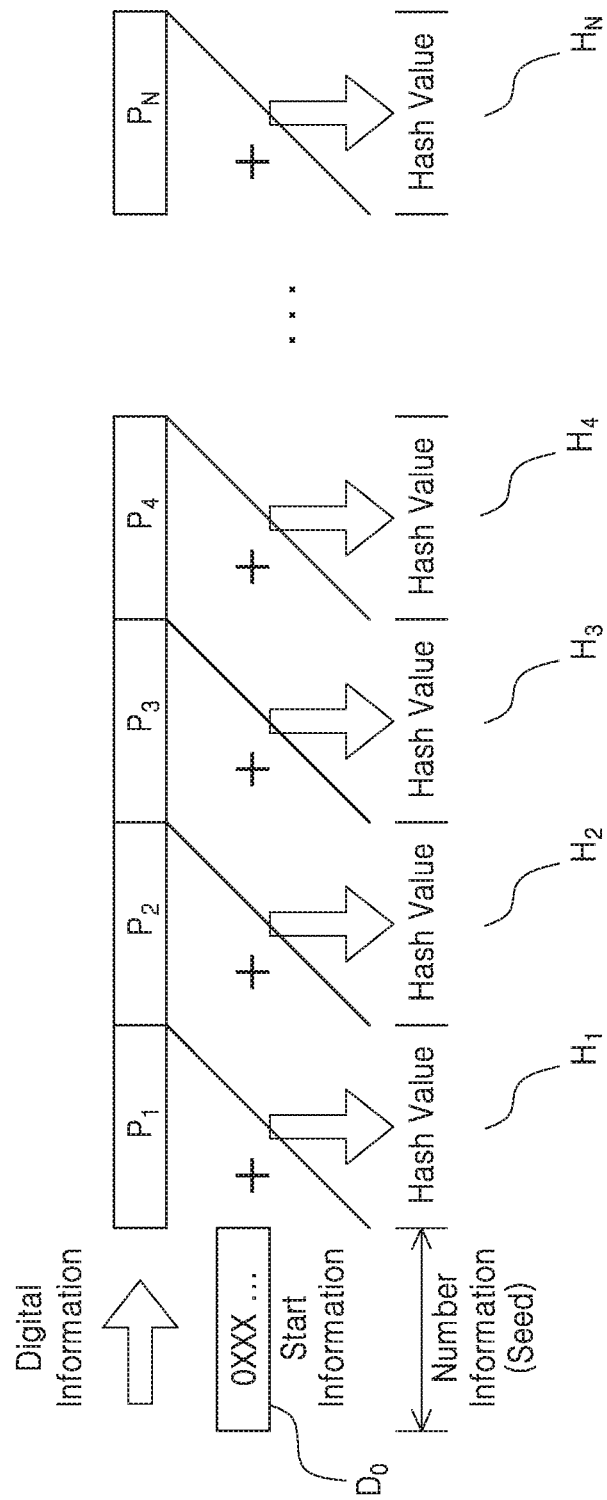
FIG. 3 is a diagram for describing an example of generating a hash value according to the method of forgery prevention of digital information, according to an embodiment of the present disclosure.

FIG. 2 is a flowchart of a method of forgery prevention of digital information, according to an embodiment of the present disclosure. FIG. 3 is a diagram for describing an example of generating a hash value according to the method of forgery prevention of digital information, according to an embodiment of the present disclosure.

Referring to FIGS. 2 and 3, first, digital information is input using the digital information obtaining unit 110 (S201). Digital information may be real-time data such as image data or voice data. Digital information is not limited to data that is continuous in real time, and may also be discrete data.

When digital information is input, a seed value $D_0$ is generated using the seed value generator 120 (S202). The seed value $D_0$ is information carrying the characteristics of digital information, and may be, for example, a time when the digital information is first generated, a location where the digital information is first generated, a title of the digital information, or a characteristic value of an apparatus for forgery prevention of the digital information. A seed value may be processed in a preset size (for example, 256 bits) by using a hash function or the like. A size of a seed value may be equal to a hash value generated using the hash value generator 140.

The information piece generator 130 generates a first information piece, that is, a No. 1 information piece $P_1$ by dividing digital information obtained using the digital information obtaining unit 110 from a front end of the digital information, into a certain size. For example, digital information may be divided into a certain size such as units of 256 bits.

Next, by using the hash value generator 140, by using a seed value and the No. 1 information piece $P_1$ as inputs, a No. 1 hash value $H_1$ with respect to the No. 1 information piece $P_1$ is generated (S204).

Also while generating the No. 1 hash value $H_1$, digital information is being obtained in real time by using the digital information obtaining unit 110. The information piece generator 130 divides digital information to generate a No. 2 information piece $P_2$ following the No. 1 information piece $P_1$. The No. 2 information piece $P_2$ may be generated before, after or in parallel with the generating of the No. 1 hash value $H_1$. Generation of subsequent information pieces as above continues until a terminal end of the digital information is divided.

Next, by using the No. 1 hash value $H_1$ and the No. 2 information piece $P_2$ as inputs, a No. 2 hash value $H_2$ is generated (S207).

Next, a No. 3 information piece $P_3$ following the No. 2 information piece $P_2$ is generated (S205), and a No. 3 hash value $H_3$ is obtained by using the No. 2 hash value $H_2$ and the No. 3 information piece $P_3$ (S207).

In the middle operations in which operations S205 and S207 are repeated, whether a subsequent information piece is at a terminal end of digital information, that is, whether the subsequent information piece is a final information piece is determined (S206), and when the subsequent information piece is not a final information piece, operations S205 and S207 are further repeated.

When a subsequent information piece is determined to be a final information piece in operation S206, a size of a final information piece $P_N$ is compensated (S208). The size of the final information piece $P_N$ may be various, and when the size of the final information piece $P_N$ does not have a set size, an empty place of the final information piece $P_N$ is filled with a preset value (for example, 0). When the size of the final information piece $P_N$ is equal to a set size, the compensating operation may be omitted.

Next, by using a previous hash value $H_{N-1}$ and the final information piece $P_N$ as inputs, a final hash value $H_N$ is calculated (S209).

The final hash value $H_N$ is transmitted with the first seed value to a reliable location (S210). The destination may be an email-server or a server that specially receives and stores only hash values and seed values or any other medium as long as a time when the hash value and a seed value are received and the hash value and the seed value are recorded. A hash value and a seed value may be transmitted to SNS (Social Network Service) such as Twitter.

A start time of generation of digital information is different from when the generation of the digital information is completed. In the present embodiment, instead of waiting until generation of digital information is completed and then generating a value whereby forgery of the digital information is verified, during a progress period in which digital information is being generated, a hash value is calculated by using a seed value and an information piece as inputs in accordance with a time when information of a preset size (information piece, for example, 256 bits) is generated.

Figure 4:
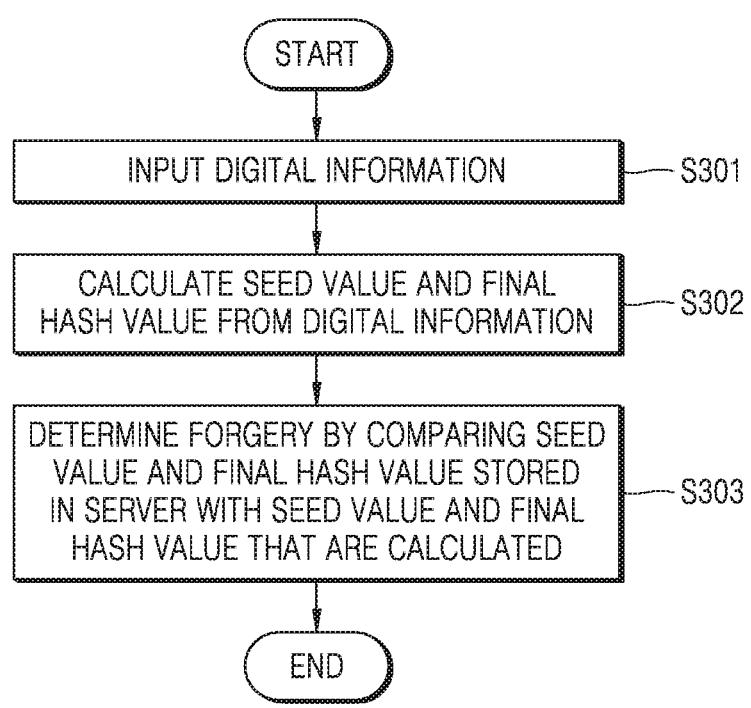
FIG. 4 is a flowchart of a method of verifying authenticity of digital information, according to an embodiment of the present disclosure.

FIG. 4 is a flowchart of a method of verifying authenticity of digital information, according to an embodiment of the present disclosure.

Referring to FIG. 4, when digital information is input (S301), a final hash value and a seed value are calculated from the digital information (S302). Next, the final hash value and the seed value calculated are compared with a final hash value and a seed value stored in a reliable server such as Twitter (S303). As a result of comparison, when the calculated final hash value and seed value correspond to the stored final hash value and seed value, it may be determined that the digital information is not forged after a time recorded to the server; when the calculated final hash value and seed value do not correspond to the stored final hash value and seed value, whether the digital information is authentic is determined.

According to the method of forgery prevention of digital information described above, the possibility of forgery of digital information while the digital information is being generated is reduced. For example, when about 30 minutes has passed in a process of recording a 1-hour video, and information between 10 minutes to 15 minutes is to be forged, to succeed in forgery, a calculator that is faster than a hash value calculator has to be used to calculate again from a corresponding hash value based on the forged information to replace a hash value of an original version that is being currently processed. In addition, transmission of an original final hash value has to be prevented at a timing when the original final hash value is to be transmitted, and a forged final hash value is to be transmitted instead. However, there is still a possibility of succeeding in forgery in this manner, and to prevent this, a following method may be used.

According to a method of forgery prevention of digital information according to an embodiment, not only a final hash value is transmitted to a server, but every generated hash value permutation is transmitted to the server in real time each time when a hash value is generated (operation S207 of FIG. 3). In this case, also there is a possibility of succeeding in forgery when a network does not operate smoothly or by stopping operation of the network artificially. To prevent this, a following method may be used.

According to a method of forgery prevention of digital information according to an embodiment, when calculating each hash value, in addition to an information piece and a previous hash value that are included as inputs, a time value is also included as an input. Accordingly, a hash value obtained from forged digital information will have a time trail falling behind an original time, and by comparing the time trail of the hash value with a call log, it may be determined whether the hash value was not generated at the time of the call but after the call. A device providing exact time information, such as a smartphone, may use time information as described above. By including a time value as an input of a hash value calculation in addition to an information piece and a previous hash value, even when a network stops operating spontaneously and a hash value for determining the authenticity of digital information is not transmitted in real time, since time information is already reflected in the hash value, the authenticity of digital information may be determined even when an authentic hash value is transmitted to a server slightly late.

Figure 5:
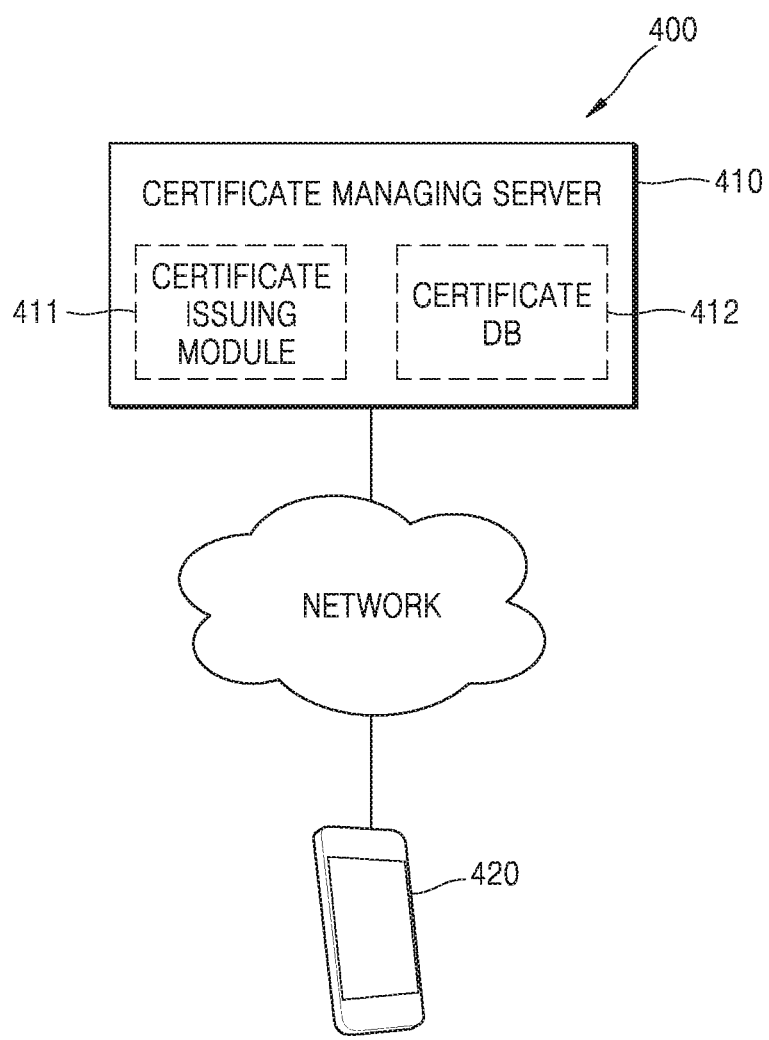
FIG. 5 illustrates a forgery prevention system to which a method of forgery prevention of digital information according to an embodiment of the present disclosure is applied.

FIG. 5 illustrates a forgery prevention system 400 to which a method of forgery prevention of digital information according to an embodiment of the present disclosure is applied.

Referring to FIG. 5, the forgery prevention system 400 according to the present embodiment may include a certificate managing server 410 and a user terminal 420 accessible to the certificate managing server 410 through a network.

The certificate managing server 410 is a device providing a service of issuing certificates certifying that digital information transmitted by the user terminal 420 accessed through a network is original, and may include a certificate issuing module 411 and a certificate database (DB) 412.

The certificate issuing module 411 may be substantially identical to the apparatus for forgery prevention of digital information, described with reference to FIG. 0.1, except that the certificate issuing module 411 obtains digital information from the user terminal 420 accessed via a network, instead of directly obtaining digital information. That is, the certificate issuing module 411 generates a seed value based on digital information that is being transmitted in real time. Information related to generation of a seed value may be received from the user terminal 420. In addition, the certificate issuing module 411 may generate information pieces by time-sequentially dividing digital information being transmitted, and generates a hash value. A hash value with respect to a first information piece is generated based on a seed value and a corresponding information piece (that is, the first information piece), and a hash value with respect to a subsequent information piece is generated based on a hash value with respect to a previous information piece immediately prior to the subsequent information piece and the subsequent information piece. A final hash value of a final information piece of digital information is calculated by using a previous hash value and the final information piece as inputs. The seed value and the final hash value may act as a certificate certifying that digital information is original (that is, that the digital information is not forged).

The certificate DB 412 stores the seed value and the final hash value. In addition, the certificate DB 412 may store digital information. The certificate DB 412 may store hash values of respective information pieces obtained by dividing digital information. Furthermore, the certificate DB 412 may store setting information needed to generate hash values or information related to generation of seed values.

The user terminal 420 is a device capable of obtaining real-time digital information such as image data or voice data and accessing a network. For example, the user terminal 420 may be a smartphone, a personal computer, a tablet or the like. The user terminal 420 accesses the certificate managing server 410 and stores and executes a digital forgery prevention application that is designed to prevent forgery of digital information being transmitted in real time and/or that is provided to prove that the digital information is not forged and/or that requests a forgery prevention service.

When the digital forgery prevention application of the user terminal 420 is activated, the user terminal 420 automatically or selectively accesses the certificate managing server 410 through a network and requests issuance of a certificate regarding real-time digital information generated in the user terminal 420.

Figure 6:
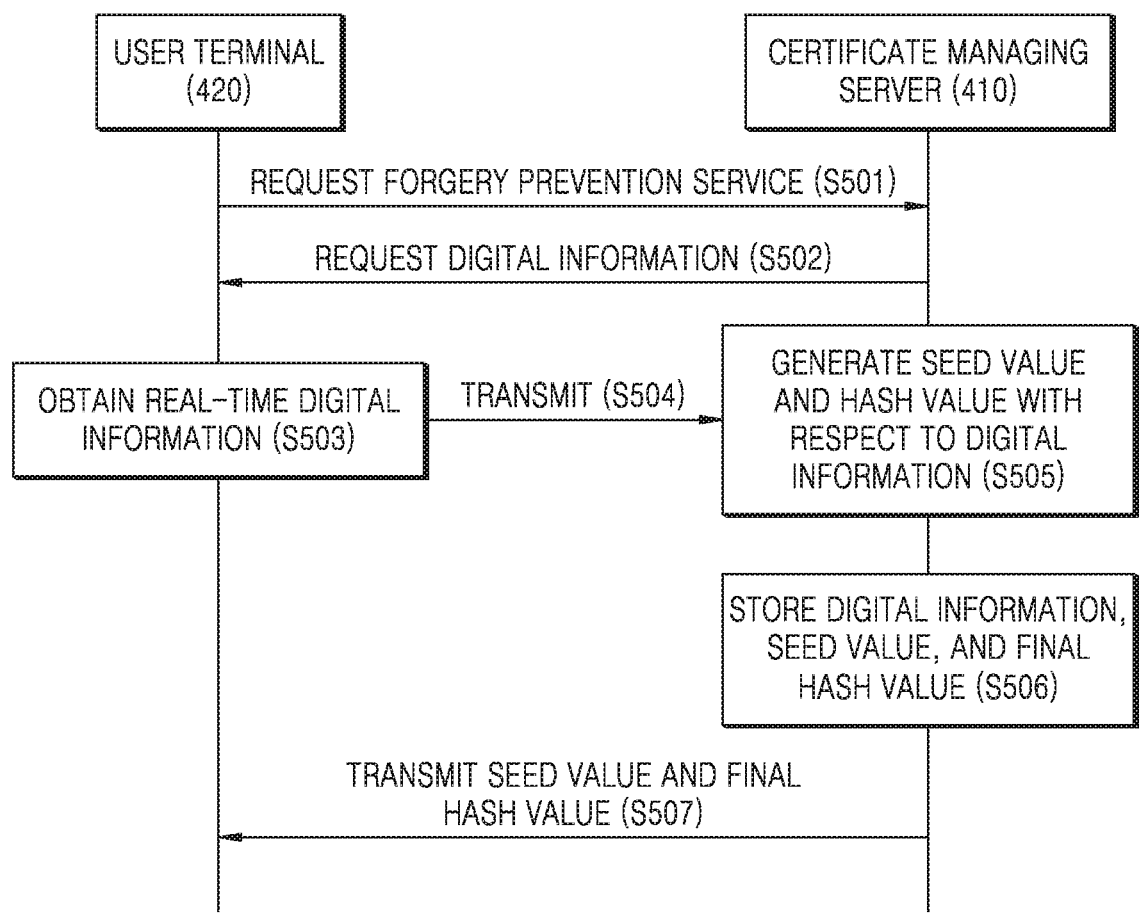
FIG. 6 is a flowchart of a method of forgery prevention of a forgery prevention system according to an embodiment of the present disclosure.

FIG. 6 is a flowchart of a method of forgery prevention of a forgery prevention system according to an embodiment of the present disclosure.

Referring to FIG. 6, a user executes a forgery prevention application of the user terminal 420 and accesses the certificate managing server 410 through a network to request a forgery prevention service (S501).

In response to the request for a forgery prevention service through a network, the certificate managing server 410 requests the user terminal 420 to input digital information (S502).

In response to the request from the certificate managing server 410 to input digital information, the user terminal 420 obtains digital information in real time (S503), and transmits, to the certificate managing server 410, information related to generation of a seed value and the digital information obtained in real time (S504). The certificate managing server 410 generates a seed value, generates information pieces by time-sequentially dividing the digital information being received in real time, and generates a hash value (S505). When transmission of the digital information is ended, the digital information, the seed value, and the final hash value with respect to the final information piece are stored (S506), and the seed value and the final hash value are transmitted to the user terminal 420 (S507).

As described above, by using the certificate managing server 410, the user may obtain a seed value and a final hash value with respect to digital information (for example, voice data or image data) obtained in real time by the user terminal 420 of the user and thus prove that the digital information is not forged.

The certificate managing server 410 does not necessarily have to store digital information. The certificate managing server 410 may store a seed value and a final hash value, and when a user requests certification of the original version of the digital information of the user, the certificate managing server 410 may receive the digital information and calculate a final hash value to compare the same with a previously stored final hash value and notify whether the digital information is original or forged or notify a third party who is interested in the authenticity of the digital information.

Moreover, when a third party has obtained digital information and wishes to determine the authenticity of the digital information, the certificate managing server 410 may allow the third party to determine the authenticity of the digital information just by providing the third party with a seed value and a final hash value such that the third party may calculate the final hash value by him/herself to determine the authenticity of the digital information. Calculation of a final hash value may be possible only when a time interval that is used when generating information pieces by time-sequentially dividing digital information or a data amount of the information pieces is included. The above-described information may be included in a seed value or may be separately provided.

The method of forgery prevention of digital information, according to the above-described embodiments, may be used to prove the validity of a contract contained in real-time digital information.

With the development of artificial intelligence, a technique of making a fake voice or a fake video recording that looks real is known. In the case of making a contract, if a digital file such as a voice recording or a video recording containing the contents of the contract is stored and presented later in order to prove the validity of the contract, it may be difficult to prove the validity of the contract by using digital information according to the related art due to the artificial intelligence technology that makes fake files look real. However, the method of forgery prevention of digital information according to the above embodiments may be available to prove the validity of a contract.

In one embodiment, both parties to a contract generate a digital file containing the contents of the contract by using the method of forgery prevention of digital information according to the above-described embodiments by using their own apparatus for forgery prevention, such as smartphones, personal computers, tablets, etc. The generated digital files are exchanged between the parties to the contract. The generated digital files may include a seed value and a final hash value. The seed value and the final hash value of the digital files are transmitted to a reliable location such as an e-mail server or a contract managing server. To confirm information such as an apparatus that has generated the digital files and a location of the generation, the information itself and the seed value may be transmitted to a server.

In one embodiment, the exchange of a digital file between parties to a contract may be executed by inputting a transmission command to each apparatus for forgery prevention, of the parties. Alternatively, when transmitting a seed value regarding digital information of each party and a hash value of a final information piece, from their respective apparatuses for forgery prevention, to an external server, a digital file containing digital information of each apparatus and the seed value with respect to the digital information and the hash value of the final information piece may be set to be automatically transmitted to the apparatus for forgery prevention of the other party. Alternatively, the exchange of a digital file between parties to a contract may be executed simultaneously.

Later, one party to the contract may present the digital file received from the other party to prove the validity of the contract. The authenticity of the digital file received from the other party may be determined based on a hash value transmitted to the server. In addition, information regarding the other party's apparatus (e.g., a smartphone) is stored in the seed value, so that one can know where the digital file is generated. The advantage of this method is that it may be verified that a digital file received from the other party is not forged, simultaneously when the digital file is generated in the other party's apparatus.

Figure 7:
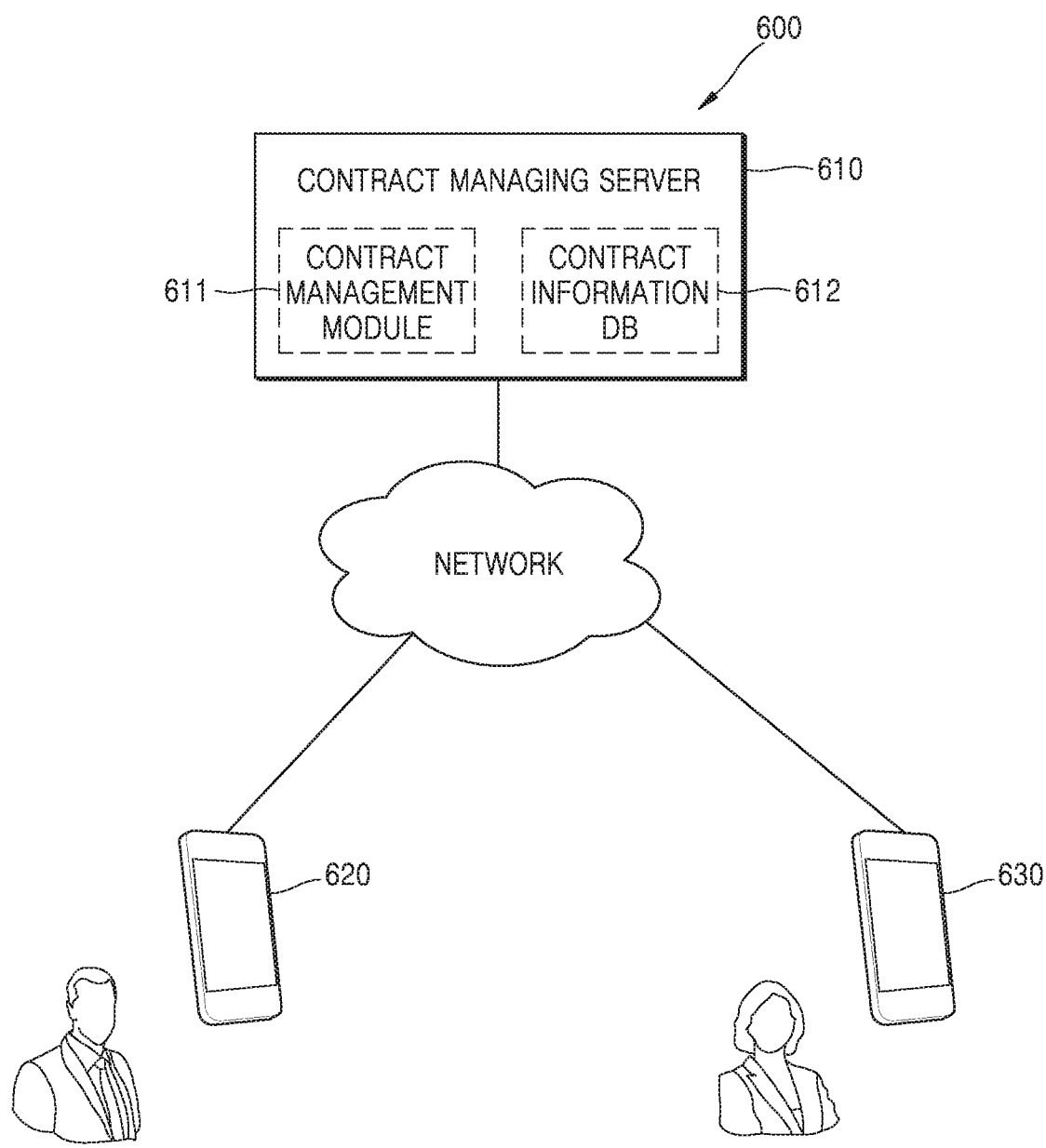
FIG. 7 illustrates a contract management system to which a method of forgery prevention of digital information, according to an embodiment of the present disclosure is applied.

FIG. 7 illustrates a contract management system 600 to which a method of forgery prevention of digital information, according to an embodiment of the present disclosure is applied.

Referring to FIG. 7, the contract management system 600 according to the present embodiment may include a contract managing server 610 and a plurality of user terminals that are accessible to the contract managing server 610 through a network. As examples of the plurality of user terminals, a first user terminal 620 and a second user terminal 630 will be described.

The contract managing server 610 is a device managing contracts by using the first and second user terminals 620 and 630 that are accessed through a network and may include a contract management module 611 and a contract information DB 612.

The contract management module 611 stores first and second seed values and first and second final hash values respectively with respect to first and second digital information that are respectively received from the first user terminal 620 and the second user terminal 630, and acts as an intermediary for a contract approval process with respect to the first user terminal 620 and the second user terminal 630. The contract information DB 612 stores the first and second seed values and the first and second final hash values with respect to the first and second digital information. In addition, the contract information DB 612 may store the first and second digital information. The contract information DB 612 may also store respective hash values of information pieces obtained by dividing the first and second digital information. Furthermore, the contract information DB 612 may also store setting information needed in generating hash values of the first and second digital information or information regarding generation of a seed value.

The first user terminal 620 and the second user terminal 630 may be the apparatuses for forgery prevention, described with reference to FIGS. 1 through 4.

Next, an operating method of a contract management system, according to the present embodiment, will be described by taking a situation where a first user and a second user make a contract with each other, as an example.

Figure 8:
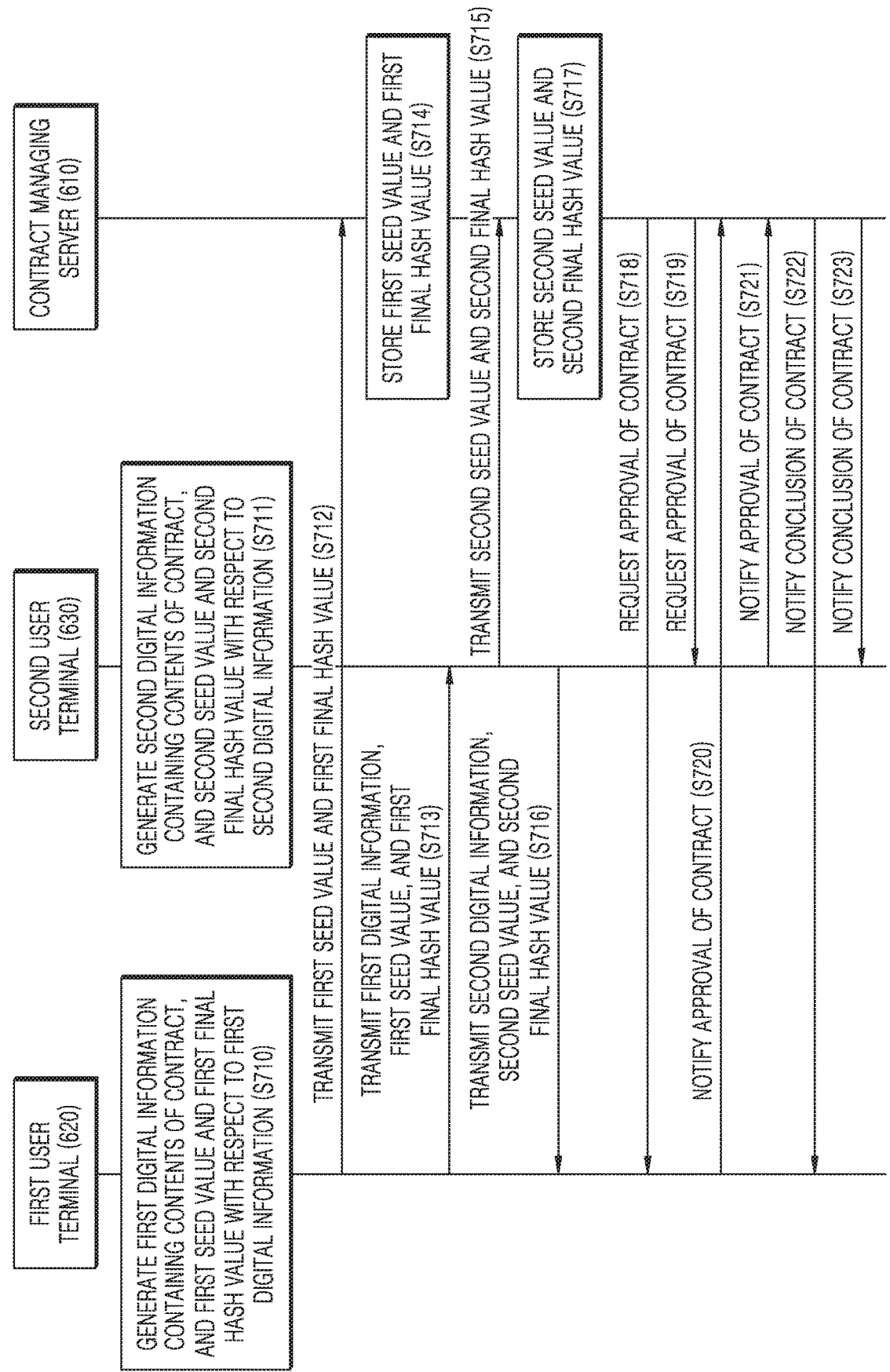
FIG. 8 is a flowchart of a contract managing method of a contract management system, according to an embodiment of the present disclosure.

FIG. 8 is a flowchart of a contract managing method of a contract management system, according to an embodiment of the present disclosure.

Referring to FIG. 8, a first user and a second user may make a contract with each other by meeting face to face or by remotely recording voice or remotely recording a video.

The first user obtains first digital information and a first seed value and a first final hash value with respect to the first digital information by using the above-described method of forgery prevention while recording voice containing the contents of the contract or recording a video containing the contents of the contract by using the first user terminal 620 (S710).

Likewise, the second user obtains second digital information and a second seed value and a second final hash value with respect to the second digital information by using the above-described method for forgery prevention while recording voice containing the contents of the contract or recording a video containing the contents of the contract by using the second user terminal 630 (S711).

The first user terminal 620 transmits the obtained first seed value and the obtained first final hash value to the contract managing server 610 (S712), and transmits the first digital information, the first seed value, and the first final hash value to the second user terminal 630 (S713). The first user terminal 620 may also transmit the first digital information to the contract managing server 610.

The contract managing server 610 stores the received first seed value and the received first final hash value (S714). When the first digital information is transmitted, the contract managing server 610 also stores the first digital information.

Likewise, the second user terminal 630 transmits the obtained second seed value and the obtained second final hash value to the contract managing server 610 (S715), and transmits the second digital information, the second seed value, and the second final hash value to the first user terminal 620 (S716). The second user terminal 630 may also transmit the second digital information to the contract managing server 610.

The contract managing server 610 stores the received second seed value and the received second final hash value (S717). When the second digital information is transmitted, the contract managing server 610 also stores the second digital information.

The contract managing server 610 receives and store the first and second seed values and the first and second final hash values, and transmits a request to approve the contract, to the first user terminal 620 and the second user terminal 630 (S718, S719).

The first user may identify the contents of the contract contained in the second digital information transmitted from the second user terminal 630 to the first user terminal 620. Furthermore, the first user may determine the authenticity of the second digital information based on the second seed value and the second final hash value by using the first user terminal 620.

Likewise, the second user may identify the authenticity of the first digital information based on the first digital information, the first seed value, and the first final hash value transmitted from the first user terminal 620 to the second user terminal 630 and identify the contents of the contract contained in the first digital information.

The first user terminal 620 and the second user terminal 630 respectively notify the contract managing server 610 of the approval of the contract by a confirmation input by the first and second users (S720, S721).

Upon being notified of the approval of the contract by each of the first user terminal 620 and the second user terminal 630, the contract managing server 610 notifies each of the first user terminal 620 and the second user terminal 630 of the conclusion of the contract (S722, S723).

While a forgery prevention process (that is, generating of a seed value and a final hash value) is performed in the first and second user terminals 620 and 630 in the embodiment described with reference to FIGS. 7 and 8, similarly to the embodiment described with reference to FIGS. 5 and 6, a forgery prevention process may also be performed in the contract managing server 610. Alternatively, a forgery prevention process may be performed in one of the first and second user terminals 620 and 630, and the other terminal may just store a result of the forgery prevention process (that is, digital information, a seed value, and a final hash value).

The method of forgery prevention of digital information according to the above-described embodiments may be applied to, for example, call recording or video recording of a smartphone, a black box, a dashboard camera, a CCTV, a sound recorder, a video recorder, or the like. When a black box, a dashboard camera, a CCTV, a sound recorder, a video recorder or the like includes a WiFi or Bluetooth connecting device, the above-described devices may be linked to a smartphone to transmit hash values to a server. Even when a communication module is not included in a black box, a dashboard camera or the like, hash values may be transmitted to a server by using an external-type communication module through a data input/output port.

According to the apparatus and method for forgery prevention of digital information, according to the above embodiments, forgery of digital information generated in real time may be prevented.

Meanwhile, the embodiments of the disclosure may be implemented as a software program including instructions stored in computer-readable storage media.

A computer may refer to a device capable of retrieving instructions stored in the computer-readable storage media and performing operations according to the embodiments of the disclosure in response to the retrieved instructions, and may include the apparatuses for forgery prevention of digital information according to the embodiments of the disclosure.

The computer-readable storage media may be provided in the form of non-transitory storage media. In this case, the term 'non-transitory' only means that the storage media do not include signals and are tangible, and the term does not distinguish whether data is semi-permanently stored or temporarily stored in the storage media.

In addition, the apparatus and method for forgery prevention of digital information according to the embodiments of the disclosure may be included in a computer program product when provided. The computer program product may be traded, as a commodity, between a seller and a buyer.

The computer program product may include a software program and a computer-readable storage medium having stored thereon the software program. For example, the computer program product may include a product (e.g. a downloadable application) in the form of a software program electronically distributed by a manufacturer of an apparatus and method for forgery prevention of digital information or through an electronic market (e.g., Google Play Store™, and App Store™). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and a terminal (e.g., a smartphone), the computer program product may include a storage medium of the server or a storage medium of the terminal. Alternatively, in a case where a third device (e.g., a smartphone) is connected to the server or terminal through communication, the computer program product may include a storage medium of the third device. Alternatively, the computer program product may include a software program itself that is transmitted from the server to the terminal or the third device or that is transmitted from the third device to the terminal.

In this case, one of the server, the terminal, and the third device may execute the computer program product to perform the method according to the embodiments of the disclosure. Alternatively, two or more of the server, the terminal, and the third device may execute the computer program product to perform the method according to the embodiments of the disclosure in a distributed manner.

For example, the server (e.g., a cloud server, an AI server, or the like) may run the computer program product stored therein to control the terminal communicating with the server to perform the method according to the embodiments of the disclosure.

It should be understood that the apparatus and method of forgery prevention of digital information, according to the embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus for forgery prevention of digital information, the apparatus comprising a computer configured to implement:
   a digital information obtaining unit configured to obtain digital information in real time;
   a seed value generator configured to generate a seed value carrying characteristics of the digital information obtained using the digital information obtaining unit;
   an information piece generator configured to divide the digital information obtained using the digital information obtaining unit into continuous information pieces with a sequence; and
   a hash value generator configured to generate a hash value of a first information piece from the seed value and the first information piece and generate a hash value of a subsequent information piece by using a hash value of a previous information piece and the subsequent information piece as inputs;
   wherein the hash value generator includes, as an input value of calculation of a corresponding hash value, a time value corresponding to an original time of forming the corresponding hash value, in addition to a corresponding information piece and a previous hash value.

2. The apparatus of claim 1, wherein the digital information obtaining unit comprises a black box, a dashboard camera, closed-circuit television (CCTV), a video camera, a microphone, or a microphone or a camera of a smartphone.

3. The apparatus of claim 1, wherein the digital information is real-time image data or real-time voice data.

4. The apparatus of claim 1, wherein the seed value is generated in a preset size based on at least one of a time when the digital information is first generated, a location where the digital information is first generated, a title of the digital information, and a characteristic value of the apparatus for forgery prevention of digital information.

5. The apparatus of claim 1, wherein a size of the seed value is equal to a size of the hash value.

6. The apparatus of claim 1, wherein the information piece generator fills an empty place of a final information piece of the sequence with a preset value when a size of the final information piece is smaller than a preset size.

7. The apparatus of claim 1, further comprising a communicator configured to transmit the seed value and a hash value of a final information piece to an external server.

8. The apparatus of claim 7, wherein the communicator transmits, to the external server, hash values of information pieces generated using the hash value generator.

9. A method of forgery prevention of digital information, the method comprising:
   obtaining digital information in real time;
   generating a seed value carrying characteristics of the obtained digital information;
   dividing the obtained digital information into continuous information pieces with a sequence; and
   generating hash values of the information pieces,
   wherein the generating hash values of the information pieces comprises
   generating a hash value of a first information piece from the seed value and the first information pieces, and
   generating a hash value of a subsequent information piece by using a hash value of a previous information piece and the subsequent information piece as inputs;
   wherein a time value corresponding to an original time of forming a corresponding hash value is included as an input value of calculation of the corresponding hash value, in addition to a corresponding information piece and a previous hash value.

10. The method of claim 9, wherein the digital information is real-time image data or real-time voice data.

11. The method of claim 9, wherein the seed value is generated in a preset size based on at least one of a time when the digital information is first generated, a location where the digital information is first generated, a title of the digital information, and a characteristic value of the apparatus for forgery prevention of digital information.

12. The method of claim 9, wherein a size of the seed value is equal to a size of the hash value.

13. The method of claim 9, wherein when a size of a final information piece of the sequence is smaller than a preset size, an empty place of the final information piece is filled with a preset value.

14. The method of claim 9, further comprising transmitting the seed value and a hash value of a final information piece to an external server.

15. The method of claim 14, further comprising transmitting hash values of the information pieces to the external server.

16. The method of claim 14, further comprising transmitting, to a second apparatus for forgery prevention, a digital file including the digital information, the seed value, and the hash value of the final information piece.

17. The method of claim 14, wherein the transmitting of the digital file to the second apparatus for forgery prevention is performed according to a transmission command, is performed when the seed value and the hash value of the final information piece is transmitted to the external server, or is performed simultaneously with an operation of receiving a second digital file from the second apparatus for forgery prevention.

18. A terminal for accessing a server through a network when a digital forgery prevention application is activated, wherein the digital forgery prevention application is installed on the terminal and executing the digital forgery prevention application comprises:
   obtaining digital information in real time;
   generating a seed value carrying characteristics of the digital information;
   dividing the digital information into continuous information pieces with a sequence; and
   generating hash values of the information pieces,
   wherein in the generating of hash values of the information pieces, a hash value of a first information piece is generated from the seed value and the first information piece, and
   a hash value of a subsequent information piece is generated by using a hash value of a previous information piece and the subsequent information piece as inputs, and
   the seed value and a hash value of a final information piece are transmitted to the server; and wherein a time value corresponding to an original time of forming a corresponding hash value is included as an input value of calculation of a corresponding hash value, in addition to a corresponding information piece and a previous hash value.

19. A certificate managing server for providing a digital forgery prevention service through a network, the certificate managing server comprising a computer configured to implement:
a digital information obtaining unit configured to obtain digital information in real time from a user terminal through the network;
a seed value generator configured to generate a seed value carrying characteristics of the digital information;
an information piece generator configured to divide the digital information into continuous information pieces with a sequence;
a hash value generator configured to generate a hash value of a first information piece from the seed value and the first information piece, and generate a hash value of a subsequent information piece by using a hash value of a previous information piece and the subsequent information piece as inputs, and
a communicator configured to transmit the seed value and a hash value of a final information piece to the user terminal;
wherein a time value corresponding to an original time of forming a corresponding hash value is included as an input value of calculation of the corresponding hash value, in addition to a corresponding information piece and a previous hash value.

20. The certificate managing server of claim 19, wherein the seed value and the hash value of the final information piece are stored in the certificate managing server.

21. A terminal for accessing a contract managing server through a network when a digital forgery prevention application is activated, wherein the digital forgery prevention application is installed on the terminal and executing the digital forgery prevention application comprises:
obtaining digital information containing contents of a contract in real time;
generating a seed value carrying characteristics of the digital information;
dividing the digital information into continuous information pieces with a sequence; and
generating hash values of the information pieces,
wherein in the generating of hash values of the information pieces, a hash value of a first information piece is generated from the seed value and the first information piece, and
a hash value of a subsequent information piece is generated by using a hash value of a previous information piece and the subsequent information piece as inputs, and
the seed value and a hash value of a final information piece are transmitted to the contract managing server, and
the digital information, the seed value, and the hash value of the final information piece are transmitted to a terminal of a party to the contract;
wherein a time value corresponding to an original time of forming a corresponding hash value is included as an input value of calculation of the corresponding hash value, in addition to a corresponding information piece and a previous hash value.

22. A computer program stored in a non-transitory recording medium, the computer program comprising at least one instruction, which when executed by a processor, causes the processor to perform a method of forgery prevention of digital information, the method comprising:
obtaining digital information in real time;
generating a seed value carrying characteristics of the digital information;
dividing the digital information into continuous information pieces with a sequence; and
generating hash values of the information pieces,
wherein in the generating of hash values of the information pieces,
a hash value of a first information piece is generated from the seed value and the first information piece, and
a hash value of a subsequent information piece is generated by using a hash value of a previous information piece and the subsequent information piece as inputs; and
wherein a time value corresponding to an original time of forming a corresponding hash value is included as an input value of calculation of the corresponding hash value, in addition to a corresponding information piece and a previous hash value.

23. An apparatus for forgery prevention of digital information, the apparatus comprising a computer configured to implement:
a digital information obtaining unit configured to obtain digital information in real time;
a seed value generator configured to generate a seed value carrying characteristics of the digital information obtained using the digital information obtaining unit;
an information piece generator configured to divide the digital information obtained using the digital information obtaining unit into continuous information pieces with a sequence; and
a hash value generator configured to generate a hash value of a first information piece from the seed value and the first information piece and generate a hash value of a subsequent information piece by using a hash value of a previous information piece and the subsequent information piece as inputs,
wherein the apparatus is configured to
repeatedly generate subsequent information pieces and corresponding respective hash values until having generated a final information piece of the sequence and a corresponding final hash value; and
based on a comparison of the final hash value and the seed value with a final hash value and a seed value previously stored on a server, determine whether or not the digital information is forged.

24. An apparatus for forgery prevention of digital information, the apparatus comprising a computer configured to implement:
a digital information obtaining unit configured to obtain digital information in real time;
a seed value generator configured to generate a seed value carrying characteristics of the digital information obtained using the digital information obtaining unit;
an information piece generator configured to divide the digital information obtained using the digital information obtaining unit into continuous information pieces with a sequence; and
a hash value generator configured to generate a hash value of a first information piece from the seed value and the first information piece and generate a hash value of a subsequent information piece by using a hash value of a previous information piece and the subsequent information piece as inputs;

wherein the seed value is generated in a preset size based on a time when the digital information is first generated.

\* \* \* \* \*